United States Patent [19]

Gross et al.

[11] Patent Number: 4,806,594
[45] Date of Patent: Feb. 21, 1989

[54] WATER CURABLE COMPOSITIONS OF SILANE CONTAINING OLE36IN POLYMERS

[75] Inventors: Laurence H. Gross, Bridgewater; Robert L. Silverman, Kendall Park; Jeffrey D. Umpleby, Princeton, all of N.J.

[73] Assignee: Union Carbide Corporation, Danbury, Conn.

[21] Appl. No.: 63,074

[22] Filed: Jun. 17, 1987

[51] Int. Cl.$^4$ .................. C08L 51/06; C08L 23/08; C08L 43/04
[52] U.S. Cl. ...................... 525/64; 525/100; 525/106
[58] Field of Search ............ 525/64, 72, 288, 100, 525/106; 524/265, 266

[56] References Cited

U.S. PATENT DOCUMENTS

| 3,870,766 | 3/1975 | Chadha | 525/106 |
| 4,481,322 | 11/1984 | Godlewski et al. | 524/265 |
| 4,535,113 | 8/1985 | Foster et al. | 524/262 |
| 4,689,362 | 8/1987 | Dexter | 524/266 |

FOREIGN PATENT DOCUMENTS 1099619  1/1968  United Kingdom ............... 525/288

Primary Examiner—Wilbert J. Briggs, Sr.
Attorney, Agent, or Firm—Saul R. Bresch

[57] ABSTRACT

A water curable composition comprising:
(a) at least one polymer selected from the group consisting of silane grafted homopolymers of ethylene, propylene, or 1-butene; silane grafted copolymers wherein a major proportion thereof is attributed to an ethylene, propylene, or 1-butene monomer; and a copolymer wherein a major proportion thereof is attributed to an ethylene, propylene, or 1-butene monomer and a minor proportion thereof is attributed to silane, each polymer having at least one silane moiety containing at least one hydrolyzable group; and
(b) at least one polysiloxane having the following formula:

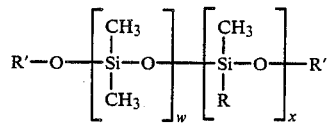

wherein
$R = C_3H_6(OC_3H_6)_y(OC_2H_4)_zOR'$
$R'$ = a radical selected from the group consisting of hydrogen, an alkyl radical having 1 to 4 carbon atoms, an alkyl acetate ester radical wherein the alkyl group has 1 to 4 carbon atoms, and a trimethyl silyl radical, and each $R'$ is alike or different
$w$ = about 20 to 120
$x$ = 1 to about 24
$y$ = 0 to about 10
$z$ = about 4 to 25
$y+z$ = about 5 to 30.

9 Claims, No Drawings

WATER CURABLE COMPOSITIONS OF SILANE CONTAINING OLE36IN POLYMERS

TECHNICAL FIELD

This invention relates to compositions containing hydrolyzable silyl modified olefin polymers and a cure booster.

BACKGROUND ART

Hydrolyzable silyl modified olefin polymers are commercially attractive because they can be simply and effectively cured with water. They are, therefore, susceptible to a broad range of processing conditions, e.g., these polymers can be extruded at temperatures far in excess of the maximum processing temperatures used in extruding peroxide containing compositions. Being capable of extrusion at high temperatures, these compositions can be extruded at faster rates and at lower pressures, and are consequently more cost effective.

The curing or crosslinking of these silyl modified olefin polymers is effected by exposing these polymers to moisture. The moisture in the atmosphere is usually sufficient to permit curing to occur over a period of up to 48 hours, especially when a silanol condensation catalyst has been added to the polymers. Since the greater the amount of crosslinking, the better the mechanical properties, the art has sought to increase the crosslinking. To this end, more catalyst was added, but this resulted in scorching, i.e., premature crosslinking, in the extruder.

DISCLOSURE OF THE INVENTION

An object of this invention, therefore, is to provide a hydrolyzable silyl modified polymer composition having increased crosslinking capability without the scorching problem attendant with the use of additional catalyst.

Other objects and advantages will become apparent hereinafter.

According to the present invention, the above object is met by providing a water curable composition comprising:

(a) at least one polymer selected from the group consisting of silane grafted homopolymers of ethylene, propylene, or 1-butene; silane grafted copolymers wherein a major propotion thereof is attributed to an ethylene, propylene, or 1-butene monomer; and a copolymer wherein a major proportion thereof is attributed to an ethylene, propylene, or 1-butene monomer and a minor proportion thereof is attributed to silane, each polymer having at least one silane moiety containing at least one hydrolyzable group; and (b) at least one polysiloxane having the following formula:

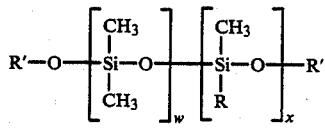

wherein:
$R = C_3H_6(OC_3H_6)_y(OC_2H_4)_zOR'$
$R' =$ a radical selected from the group consisting of hydrogen, an alkyl radical having 1 to 4 carbon atoms, an alkyl acetate ester radical wherein the alkyl group has 1 to 4 carbon atoms, and a trimethyl silyl radical, and each $R'$ can be alike or different
$w =$ about 20 to 120
$x = 1$ to about 24
$y = 0$ to about 10
$z =$ about 4 to 25
$y + z =$ about 5 to 30.

DETAILED DESCRIPTION

It is understood that the term "copolymer" includes polymers having two or more different monomers incorporated into the same polymer chain. A major proportion, i.e., more than 50 percent by weight, of each copolymer is attributed to ethylene, propylene, or 1-butene. The balance of the copolymer is attributed to silane and/or various organic compounds having 2 to 20 carbon atoms such as vinyl esters, alkyl methacrylates, alkyl acrylates, alpha-olefins, and diolefins. Examples of these compounds are 1-hexene, 4-methyl-1-pentene, 1-undecene, ethyl acrylate, vinyl acetate, methyl methacrylate, 1,4-hexadiene, ethylidene norbornene, dicyclopentadiene, butyl acrylate, and methyl acrylate. Terpolymers such as ethylene/propylene/ethylidene norbornene rubbers are of particular interest.

The silane grafted olefin homopolymer or copolymer can be prepared by the technique described in examples 1 and 2 below. In this polymer, the portion attributed to the silane is present in an amount of about 0.5 percent to about 10 percent by weight based on the weight of the polymer or copolymer and is preferably incorporated into the polymer or copolymer in an amount of about 0.5 to about 4 percent by weight. The silane used to modify the polymer or copolymer can be, among others, a vinyl trialkoxy silane such as vinyl trimethoxy silane, vinyl triethoxy silane, or vinyl isopropoxy silane. Generally speaking, any unsaturated monomeric silane can be used. If slower water cure or better shelf stability is desired, vinyl triisobutyoxy silane or vinyl tris-(2-ethyl-hexoxy) silane can be used.

A free radical generator or catalyst is used in the preparation of the silane grafted polymer. Among the most useful free radical generators are dicumyl peroxide, lauroyl peroxide, azobisisobutyronitrile, benzoyl peroxide, tertiary butyl perbenzoate, di(tertiary-butyl) peroxide, cumene hydroperoxide, 2,5-dimethyl-2,5-di(t-butyl-peroxy) hexyne, 2,5-dimethyl-2,5-di (t-butyl-peroxy)hexane, tertiary butyl hydroperoxide, and isopropyl percarbonate. The organic peroxides are preferred. About 0.001 to about 5 percent by weight of free radical generator based on the weight of the polymer or copolymer is used, preferably about 0.001 to about 0.05 percent by weight.

The copolymer of ethylene and silane can be prepared by the process described in U.S. Pat. No. 3,225,018 issued on Dec. 21, 1965 or U.S. Pat. No. 4,574,133 issued on Mar. 4, 1986, both of which are incorporated by reference herein. The portion of the copolymer attributed to the silane is in the range of about 0.5 to about 10 percent by weight based on the weight of the copolymer and is preferably in the range of about 0.5 to about 4 percent by weight.

Various other processes for preparing silane grafted polyethylene and ethylene/silane copolymers and numerous unsaturated silanes suitable for use in preparing these polymers and bearing hydrolyzable groups such as alkoxy, oxy aryl, oxyaliphatic, and halogen are mentioned in U.S. Pat. Nos. 3,075,948; 4,412,042; 4,413,066;

and 4,593,071, all of which are incorporated by reference herein.

The compositions of this invention are thermoforming and find utility in thermoforming operations, especially in molding and extrusion applications. They are particularly useful in the insulation and jacketing of wires and cables.

It will be understood that, for industrial purposes, the polysiloxane is packaged in a variety of different ways, e.g., (i) silane grafted polymer or copolymer+polysiloxane; (ii) silane grafted polymer or copolymer+polysiloxane+silanol condensation catalyst; (iii) polysiloxane+monomeric unsaturated silane; (iv) polysiloxane+monomeric unsaturated silane+organic peroxide; (v) polysiloxane+monomeric unsaturated silane+organic peroxide+silanol condensation catalyst.

As pointed out above, the hydrolyzable silyl modified olefin polymers can be cured or crosslinked by exposing the polymer to moisture. The crosslinking is accelerated in the presence of a conventional silanol condensation catalyst such as dibutyl tin dilaurate, dioctyl tin maleate, stannous acetate, stannous octoate, lead napthenate, zinc octoate, iron 2-ethyl hexoate, and other metal carboxylates. Further acceleration of crosslinking can be accomplished by adding a cocatalyst such as tetramethoxy titanate, tetraisopropyl titanate, tetramethyl titanate, or other organo titanates mentioned in U.S. Pat. No. 4,446,279 issued on May 1, 1984, which is incorporated by reference herein. The catalysts can be introduced into the composition in conventional amounts, typically about 0.005 to about 1 part by weight of primary catalyst per 100 parts by weight of polymer and about 0.25 to about 10 parts by weight of cocatalyst per 100 parts by weight of polymer.

The component, which is responsible for the increase in crosslinking (also referred to as a cure booster), is an organomodified polydimethyl siloxane (or polysiloxane) having the following formula:

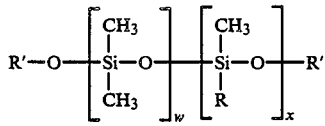

wherein
$R = C_3H_6(OC_3H_6)_y(OC_2H_4)_zOR'$
$R'$ = a radical selected from the group consisting of hydrogen, an alkyl radical having 1 to 4 carbon atoms, an alkyl acetate ester radical wherein the alkyl group has 1 to 4 carbon atoms, and a trimethyl silyl radical, and each $R'$ can be alike or different
w = about 20 to 120
x = 1 to about 24
y = 0 to about 10
z = about 4 to 25
y + z = about 5 to 30.

A preferred polysiloxane has a molecular weight of less than about 20,000; $R'$ = hydrogen; w + x = about 60 to 120; w/x > 10; y = 0; and z = about 4 to 10.

In a specific embodiment, w = 72; x = 5; y = 0; and z = 6.6.

The polysiloxane component and a process for preparing it are described in U.S. Pat. No. 4,046,930 issued on Sept. 6, 1977 and U.S. Pat. No. 4,535,113 issued on Aug. 13, 1985, both incorporated by reference herein.

The polysiloxane component can be present in the water curable composition in an amount of about 0.01 to about 3 parts by weight of polysiloxane per 100 parts by weight of polymer and is preferably used in an amount of about 0.05 to about 1 part by weight per 100 parts by weight of polymer. It is understood that when the polymer is referred to, the total polymer content of the composition is contemplated.

In addition to the components mentioned above, various conventional additives can be added in conventional amounts to the compositions. Typical additives are antioxidants, ultraviolet absorbers, antistatic agents, pigments, dyes, fillers including carbon black and aluminum silicate, slip agents, fire retardants, stabilizers, crosslinking agents, halogen scavengers, smoke inhibitors, processing aids, flow aids, lubricants, plasticizers, and viscosity control agents.

The invention is illustrated by the following examples. Parts and percentages are by weight.

EXAMPLE 1

The formulation and procedure for preparing a silane grafted polyethylene is described.

The polyethylene used in this example is a low density polyethylene having a density of 0.90 and a melt index of 1.0. The low density polyethylene can be made by the processes described in European Patent Application Nos. 0 120 501 and 0 120 503, both published on Oct. 3, 1984 and incorporated by reference herein, wherein ethylene is polymerized together with an alpha olefin comonomer having 3 to 8 carbon atoms or by other conventional techniques. In the present application, low density polyethylenes are considered to include copolymers of ethylene and a minor proportion of alpha olefin.

100 parts of polyethylene, 0.2 part of polymerized 1,3-dihydro-2,2,4-trimethylquinoline (an antioxidant), 0.1 part of dicumyl peroxide, and 4 parts of vinyl tri-2-ethyl-hexoxy silane are mixed in a laboratory Brabender mixer at a temperature in the range of about 80° C. to about 115° C., a temperature low enough to keep the dicumyl peroxide below its decomposition temperature.

After mixing for five minutes, the temperature is raised to a temperature in the range of about 150° C. to about 220° C. The batch is then mixed for 5 to 10 minutes during which grafting of the silane to the polyethylene occurs.

The antioxidant is used as a radical trap to control the amount of crosslinking.

The silane grafted polyethylene is tested for reactivity as follows: 104.3 parts of silane grafted polyethylene is mixed with 0.5 part of dibutyl tin dilaurate or dioctyl tin maleate for five minutes at about 160° C.

A test slab, three inches by seven inches by 0.075 inch thick, is compression molded at about 150° C. from the mixture and then cooled in the mold.

The slab is tested immediately in a rheometer at 182° C. The torque reading is 8 to 10 units. The slab is then placed in water at 70° C. for 48 hours and tested, once more, in a rheometer at 182° C. The torque reading is 40 to 50 units. This indicates that water crosslinking has occurred. The increase in torque units indicates the degree of crosslinking.

EXAMPLE 2

Example 1 is repeated except that 3 parts of vinyltriisobutoxysilane and 0.1 part of the antioxidant, tetrakis [methylene(3-5-tert-butyl-4-hydroxyhydro-cinnamate] methane, are used; initial mixing is in the range of 110° C. to 120° C.; grafting is for 5 minutes at 185° C.; first rheometer test is at 182° C. with same result; slab is immersed in water for 16 hours; and second torque reading is 40 units.

EXAMPLE 3

In this example and examples 4 to 18, the polysiloxane has the formula set forth above wherein w=72; x=5; y=0; and z=6.6.

The following composition is used in the example:

|   | Weight Percent |
|---|---|
| 1. high density polyethylene (density >0.941) | 80.01 |
| 2. linear low density polyethylene (density <0.925) | 15.04 |
| 3. carbon black | 2.28 |
| 4. antioxidant | 0.37 |
| 5. ground silica | 0.60 |
| 6. polysiloxane | 0.60 |
| 7. dicumyl peroxide | 0.09 |
| 8. dibutyltin dilaurate | 0.03 |
| 9. vinyl trimethoxy silane | 0.98 |

Grafting of vinyl trimethoxy silane to the polyethylenes occurs by decomposition of the dicumyl peroxide when the composition is heated.

A. The composition is exposed to water for 18 hours after silane grafting. The degree of crosslinking is determined by Monsanto rheometer torque increase, i.e., torque after crosslinking minus torque before silane grafting and exposure to water. The torque increase is 29 inch-pounds.

B. The example is repeated except that components 5 and 6 are excluded. The torque increase is only 14 inch-pounds.

EXAMPLE 4

Two compositions are prepared as follows:

|   | Weight Percent | |
|---|---|---|
|   | A | B |
| 1. ethylene/silane copolymer (density = 0.923; melt index = 2; silane portion 1.5% by weight) | 95 | 95 |
| 2. dioctyltin maleate | 0.08 | 0.08 |
| 3. tetrakis [methylene (3,5 di-tert-butyl-4-hydroxy hydro-cinnamate)] methane | 0.13 | 0.13 |
| 4. polysiloxane | 0.06 | 0.06 |
| 5. carbon black | 0 | 0.45 |
| 6. polyethylene (density = 0.918) | balance | balance |

Both compositions exhibit crosslinking similar to Example 1A.

EXAMPLES 5 to 8

The following components are used in the examples:
1. ethylene/silane copolymer (melt index=1.5; density=0.923)
2. catalyst masterbatch:

|   | Weight Percent |
|---|---|
| linear low density polyethylene (melt index = 2.0; density = 0.918) | 92.5 |
| antioxidant (see example 4, component 3) | 5.0 |
| dioctyltin maleate | 1.25 |
| fluorocarbon flow aid | 1.25 |

3. polysiloxane
4. linear low density polyethylene (melt index=2.0; density=0.918)

The materials are dry mixed and extruded through a Brabender extruder (20/60/20 screen pack) at a melt temperature of 185°. The 20 mil tapes produced are cured in 90° C. water for 2 hours for 18 hours. A measure of the crosslinking that results is obtained by carrying out the ICEA (Insulated Cable Engineers Association) Hot Creep Test (publication T-28-562). Lower values indicate a greater degree of crosslinking. The test measures percent elongation of a tensile bar when subjected to 20 newtons/square centimeter at 150° C. for 15 minutes.

The variables and results are shown in Table I.

TABLE I

|   | Examples: | | | |
|---|---|---|---|---|
|   | 5 | 6 | 7 | 8 |
|   | Weight Percent | | | |
| Components |   |   |   |   |
| 1 | 94 | 88 | 82 | 83.2 |
| 2 | 6 | 6 | 6 | 6 |
| 3 | 0 | — | — | 0 |
| 4 | 0 | — | — | 10.8 |
| mixture of 3 & 4 | 0 | 6 | 12 | 0 |

The surface appearance of the Example 5 tape is better than the tapes of Examples 6, 7, and 8.

| Hot Creep After Cure |   |   |   |   |
|---|---|---|---|---|
| 2 hours | 79 | 113 | 55 | 152 |
| 18 hours | 59 | 42 | 42 | 46 |

EXAMPLES 9 to 18

The following components are used in the examples:
1. polysiloxane
2. ground silica
3. dicumyl peroxide
4. vinyl trimethoxy silane
5. dibuyltin dilaurate
6. linear low density polyethylene (density=0.918; melt index=2.0 decigrams/minute)
7. low density polyethylene (density=0.92; melt index=2.0 decigrams/minute)
8. high density polyethylene (density=0.953; melt index=7.5 decigrams/minute)
9. high density polyethylene (density=0.948; melt index=0.2 decigrams/minute)
10. linear low density polyethylene (density=0.920; melt index=0.8 decigrams/minute)
11. carbon black
12. antioxidant High density polyethylene can be made by the process described in Introduction to Polymer Chemistry, Stille, publ. Wiley and Sons, 1962, section 9.1, particularly page 151, and linear low density polyethylene can be made by the process described in U.S. Pat. No.

4,076,698 issued on Feb. 28, 1978. Both publications are incorporated by reference herein.

The procedure for these examples is to first prepare a mixture of the desired polyethylene(s) and components 1 to 6. This is the original or composition I. It is tested with a Monsanto oscillating disk rheometer (ODR) for torque at 360° F. using rotor oscillation of a ±5 degree arc. Results are given in pound-inches (lb. in.). Grafting is then undertaken in a press at 180° C. for 15 minutes. A small amount of crosslinking takes place during grafting. The composition is now in the "after graft" state referred to as composition II. It is again tested with the ODR for torque. The composition is then immersed in 90° C. water for 18 hours. This is the crosslinked composition, composition III. It is tested with the ODR for torque.

The following Table II sets forth the variables and results:

TABLE II

| | Examples: | | | | | | | | | |
|---|---|---|---|---|---|---|---|---|---|---|
| | 9 | 10 | 11 | 12 | 13 | 14 | 15 | 16 | 17 | 18 |
| Components | | | | Weight Percent | | | | | | |
| 1 | — | 0.17 | 0.51 | — | 0.26 | — | 0.59 | — | 0.59 | — |
| 2 | — | 0.17 | 0.51 | — | 0.26 | — | 0.59 | — | 0.59 | — |
| 3 | 0.13 | 0.13 | 0.13 | 0.13 | 0.13 | 0.09 | 0.09 | 0.09 | 0.09 | 0.09 |
| 4 | 1.33 | 1.33 | 1.33 | 1.33 | 1.33 | 0.98 | 0.98 | 0.98 | 0.98 | 0.98 |
| 5 | 0.05 | 0.05 | 0.05 | 0.05 | 0.05 | 0.03 | 0.03 | 0.03 | 0.03 | 0.03 |
| 6 | 98.49 | 98.15 | 97.47 | — | 4.59 | — | 10.68 | — | 10.68 | 10.68 |
| 7 | — | — | — | 98.49 | 93.38 | 98.90 | 87.04 | — | — | — |
| 8 | — | — | — | — | — | — | — | 60.70 | 53.42 | 54.12 |
| 9 | — | — | — | — | — | — | — | 30.35 | 26.72 | 27.08 |
| 10 | — | — | — | — | — | — | — | 4.83 | 4.24 | 4.30 |
| 11 | — | — | — | — | — | — | — | 2.59 | 2.28 | 2.31 |
| 12 | — | — | — | — | — | — | — | 0.43 | 0.38 | 0.38 |
| Results | | | | ODR (lb-in) | | | | | | |
| Composition I | 5 | 3 | 4 | 3.5 | 3 | 3.5 | 3 | 7 | 5 | 6 |
| Composition II | 35 | 38 | 39 | 10.5 | 12 | 8 | 9 | 12 | 21 | 11.5 |
| Composition III | 50 | 53 | 60 | 17 | 23.5 | 17 | 24 | 15 | 34 | 20 |

EXAMPLE 19

A solution of 89 parts of vinyltrimethoxy silane, 8.3 parts dicumyl peroxide, and 2.7 parts dibutyltin dilaurate is made up under nitrogen. This is solution 1. Two 135 gram aliquots of solution 1 are pipetted into flasks. To one flask is added 25 grams of the polysiloxane of examples 3 to 18 to form solution 2 and, to another flask, 25 grams of the polysiloxane having the above formula wherein R'=hydrogen; w is about 20 to 120, but averages 50; and x=0 to form solution 3. Clear, homogeneous solutions are formed in each case.

To a glass jar containing 100 grams of granular ethylene/butene copolymer having a density of 897 kilograms per cubic meter and a melt flow index of 7.1 grams per 10 minutes (190° C.; 2.16 kilogram) are added 1.35 grams of solution 1. Similarly, 1.6 grams of solutions 2 and 3 are added to 100 gram positions of the same copolymer. The jars are held at 50° C., with occasional shaking, for 2 hours to homogenize the mixtures.

Grafting of the resin is accomplished by charging a melt indexer with 7 grams of each mixture. The melt-indexer is held at 190° C. and a preheat of 6 minutes is given. The melt index of the resin is measured using a weight of 2.16 kilograms. The extrudates are cut off and weighed over one minute intervals and the melt indices are calculated as a function of time. After 5 minutes, the weight is changed to 5 kilograms and the resulting extrudates are cut off over 30 second intervals and weighed to afford the 5 kilogram melt flow indices. The results are set forth in Table III.

The 5 kilogram extrudates are pressed into a flat film of about 1.5 millimeter thickness and immersed in water at 70° C. for 18 hours. The degree of crosslinking is determined according to ASTM D2765 (16 hours in boiling decalin). The results are set forth in Table IV.

TABLE II

| SOLUTIONS | | | |
|---|---|---|---|
| TIME (minutes) | 1 | 2 | 3 |
| | MELT INDEX (2.16 kilograms) | | |
| 7.5 | 1.35 | 0.9 | 1.1 |
| 8.5 | 1.3 | 0.95 | 0.85 |
| 9.5 | 0.9 | 0.85 | 0.75 |
| 10.5 | 0.8 | 0.8 | 0.75 |
| 11.5 | 0.75 | 0.8 | 0.75 |
| | MELT INDEX (5 kilograms) | | |
| 13 | 2.9 | 3.4 | 3.1 |
| 13.5 | 2.9 | 3.35 | 2.9 |
| 14 | 2.4 | 3.2 | 3.1 |

TABLE IV

| GEL CONTENT (percent) | 47.1 | 61.5 | 57.0 |
|---|---|---|---|

We claim:

1. A water curable composition comprising:
(a) at least one polymer selected from the group consisting of silane grafted homopolymers of ethylene, propylene, or 1-butene; silane grafted copolymers wherein a major proportion thereof is attributed to an ethylene, propylene, or 1-butene monomer; and a copolymer wherein a major proportion thereof is attributed to an ethylene, propylene, or 1-butene monomer and a minor proportion thereof is attributed to silane, each polymer having at least one silane moiety containing at least one hydrolyzable group;
(b) at least one polysiloxane having the following formula:

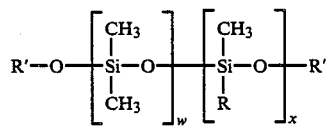

wherein $R = C_3H_6(OC_3H_6)_y(OC_2H_4)_z OR'$

R' = a radical selected from the group consisting of hydrogen, an alkyl radical having 1 to 4 carbon atoms, an alkyl acetate ester radical wherein the alkyl group has 1 to 4 carbon atoms, and a trimethyl silyl radical, and each R' can be alike or different w = about 20 to 120 x = 1 to about 24 y = 0 to about 10 z = about 4 to 25 y + z = about 5 to 30; and (c) at least one silanol condensation catalyst.

2. The composition defined in claim 1 wherein the polysiloxane has a molecular weight of less than about 20,000; R' = hydrogen; w + x = about 60 to 120; w/x > 10; y = 0; and z = about 4 to 10.

3. The composition defined in claim 1 wherein for each 100 parts by weight of polymer there are present about 0.01 to about 3 parts by weight of polysiloxane.

4. The composition defined in claim 2 wherein for each 100 parts by weight of polymer there are present about 0.05 to about 1 part by weight of polysiloxane.

5. The composition defined in claim 3 wherein the monomer in major proportion is ethylene.

6. The composition defined in claim 1 wherein there is present about 0.005 to about 1 part by weight of catalyst per 100 parts by weight of polymer.

7. The composition defined in claim 6 wherein for each 100 parts by weight of polymer there are present about 0.01 to about 3 parts by weight of polysiloxane.

8. A process for increasing crosslinking in thermoforming type compositions comprising at least one polymer selected from the group consisting of silane grafted homopolymers of ethylene, propylene, or 1-butene; silane grafted copolymers wherein a major proportion thereof is attributed to an ethylene, propylene, or 1-butene monomer; and a copolymer wherein a major proportion thereof is attributed to an ethylene, propylene, or 1-butene monomer and a minor proportion thereof is attributed to silane, each polymer having at least one silane moiety containing at least one hydrolyzable group, the process comprising (a) admixing with the polymer, at least one polysiloxane having the following formula:

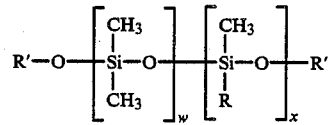

wherein $R = C_3H_6(OC_3H_6)_y(OC_2H_4)_z OR'$

R' = a radical selected from the group consisting of hydrogen, an alkyl radical having 1 to 4 carbon atoms, an alkyl acetate ester radical wherein the alkyl group has 1 to 4 carbon atoms, and a trimethyl silyl radical, and each R' can be alike or different w = about 20 to 120 x = 1 to about 24 y = 0 to about 10 z = about 4 to 25 y + z = about 5 to 30;

and at least one silanol condensation catalyst; (b) forming a product from the mixture at a temperature above the melting point of the polymer; and (c) exposing the product to moisture for a sufficient time to cure the product.

9. A water curable composition comprising:

(a) at least one polymer selected from the group consisting of silane grafted homopolymers of ethylene, propylene, or 1-butene; silane grafted copolymers wherein a major proportion thereof is attributed to an ethylene, propylene, or 1-butene monomer; and a copolymer wherein a major proportion thereof is attributed to an ethylene, propylene, or 1-butene monomer and a minor proportion thereof is attributed to silane, each polymer having at least one silane moiety containing at least one hydrolyzable group;

(b) at least one polysiloxane having the following formula:

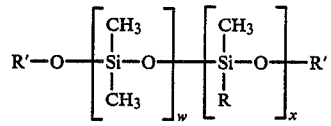

wherein $R = C_3H_6(OC_3H_6)_y(OC_2H_4)_z OR''$

R' = a radical selected from the group consisting of an alkyl radical having 1 to 4 carbon atoms, an alkyl acetate ester radical wherein the alkyl group has 1 to 4 carbon atoms, and a trimethyl silyl radical, and each R' can be alike or different R'' = hydrogen or R' w = about 20 to 120 x = 1 to about 24 y = 0 to about 10 z = about 4 to 25 y + z = about 5 to 30; and (c) at least one silanol condensation catalyst.

* * * * *

UNITED STATES PATENT AND TRADEMARK OFFICE
CERTIFICATE OF CORRECTION

PATENT NO. : 4,806,594

DATED : February 21, 1989

INVENTOR(S) : Lawrence H. Gross et al.

It is certified that error appears in the above-identified patent and that said Letters Patent is hereby corrected as shown below:

In The Title of Invention, "OLE36IN" should read -- OLEFIN --.

Title Page, ABSTRACT line 19; column 1, line 67; column 3, line 53; column 9, line 5; column 10, lines 5 and 44, "acetate ester" is changed to -- acetyl --.

Column 3, line 63, and column 9, line 17, "R' = hydrogen" is deleted.

Column 5, line 14, after "wherein", the following is inserted -- the R' end groups are trimethyl silyl; the R' in the R group is hydrogen; --.

Column 7, line 49, after "wherein", "R'=" is changed to -- the R' end groups are trimethyl silyl; the R' in the R group is --.

Signed and Sealed this

Twenty-first Day of November, 1989

Attest:

JEFFREY M. SAMUELS

Attesting Officer     Acting Commissioner of Patents and Trademarks